United States Patent
Mainguet et al.

(10) Patent No.: US 8,721,172 B2
(45) Date of Patent: May 13, 2014

(54) METHOD FOR CALIBRATING AN ELECTRONIC CHIP, ELECTRONIC CHIP AND HEAT PATTERN DETECTOR FOR THIS METHOD

(75) Inventors: Jean-Francois Mainguet, Grenoble (FR); Alain Chambron, Saint-Egreve (FR); Guy-Michel Parat, Claix (FR)

(73) Assignee: Commissariat a l'Energie Atomique et aux Energies Alternatives, Paris (FR)

( * ) Notice: Subject to any disclaimer, the term of this patent is extended or adjusted under 35 U.S.C. 154(b) by 170 days.

(21) Appl. No.: 13/102,240

(22) Filed: May 6, 2011

(65) Prior Publication Data
US 2011/0286491 A1 Nov. 24, 2011

(30) Foreign Application Priority Data
May 6, 2010 (FR) ...................................... 10 53555

(51) Int. Cl.
*G01K 15/00* (2006.01)
(52) U.S. Cl.
USPC ...................................... 374/1; 374/E15.001
(58) Field of Classification Search
USPC ............. 374/1, 120–124, 170, 185, 178, 110, 374/112, 166, 163, 57; 702/85, 99
See application file for complete search history.

(56) References Cited

U.S. PATENT DOCUMENTS

| | | | |
|---|---|---|---|
| 6,091,837 A | 7/2000 | Dinh | |
| 6,289,114 B1 | 9/2001 | Mainguet | |
| 6,908,224 B2 * | 6/2005 | Schneider et al. | 374/1 |
| 7,194,113 B2 | 3/2007 | Greschitz et al. | |
| 7,385,381 B1 | 6/2008 | Mainguet | |
| 7,519,205 B2 | 4/2009 | Chou | |
| 7,731,418 B2 * | 6/2010 | Price | 374/1 |
| 2006/0115128 A1 | 6/2006 | Mainguet | |

FOREIGN PATENT DOCUMENTS

| | | |
|---|---|---|
| EP | 0825831 | 10/1996 |
| EP | 0798546 | 10/1997 |
| EP | 1857797 | 11/2007 |
| WO | 99/26187 | 5/1999 |

OTHER PUBLICATIONS

Peter Bishop "Atmel's FingerChip Technology for Biometric Security" *Atmel Corporation*, pp. 1-23 (2002).

* cited by examiner

*Primary Examiner* — Lisa Caputo
*Assistant Examiner* — Janice M Soto
(74) *Attorney, Agent, or Firm* — Occhiuti & Rohlicek LLP

(57) ABSTRACT

A method for calibrating an electronic chip comprises: the placing of a calibration transducer of a chip to be calibrated in contact with a first element and the measurement of a corresponding temperature variation $\Delta Tc$ with this calibration transducer, the calibration thermal transducer having thermal characteristics different from those of the normal transducer so as to measure a temperature variation $\Delta Tc$ that is different from a variation $\Delta T1$ measured by the normal transducer, and the calibration of the chip to be calibrated on the basis of the measured variations $\Delta T1$ and $\Delta Tc$.

12 Claims, 2 Drawing Sheets

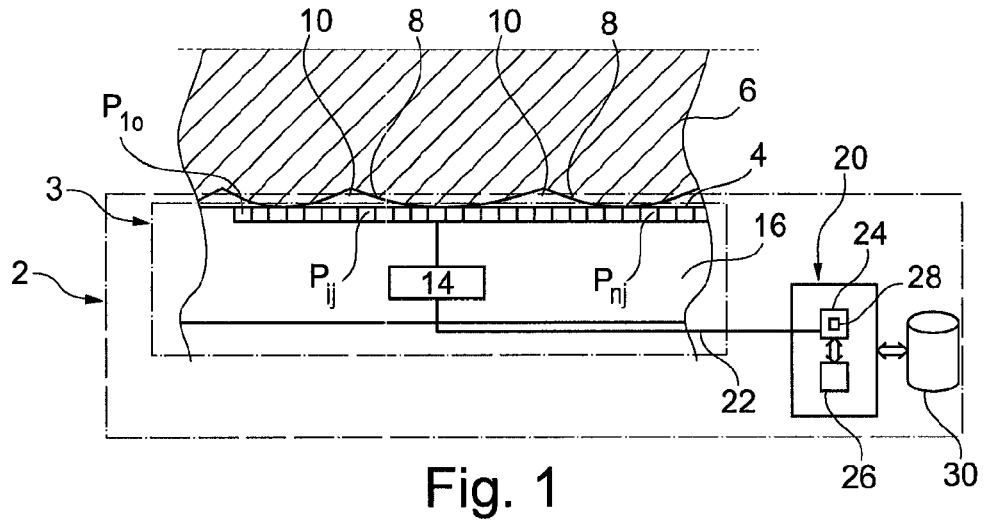
Fig. 1
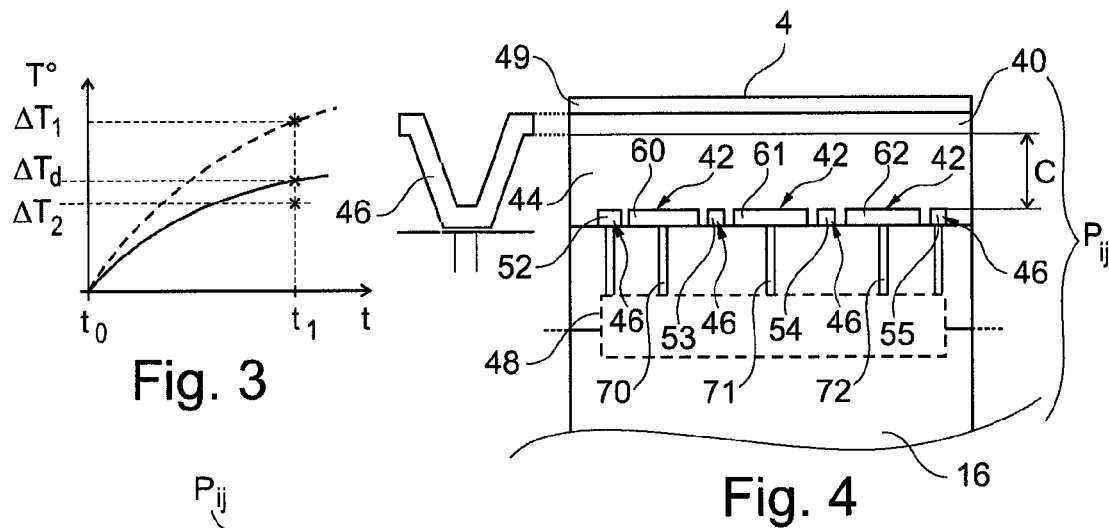
Fig. 3
Fig. 4
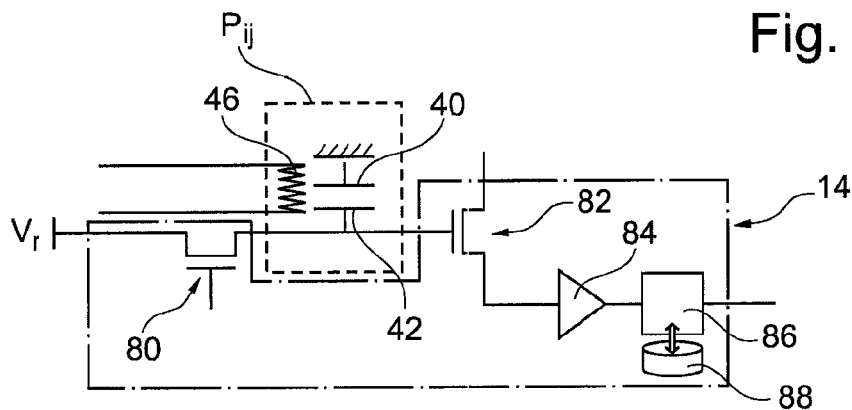
Fig. 7

US 8,721,172 B2

METHOD FOR CALIBRATING AN ELECTRONIC CHIP, ELECTRONIC CHIP AND HEAT PATTERN DETECTOR FOR THIS METHOD

CROSS REFERENCE TO RELATED APPLICATIONS

This application claims the benefit of the May 6, 2010 priority date of French application 1053555. The contents of the foregoing application is incorporated herein by reference.

FIELD OF DISCLOSURE

The invention pertains to a method for calibrating an electronic chip in order to detect a heat pattern, as well as an electronic chip and a heat pattern detector for carrying out this method.

BACKGROUND

Typically, an electronic chip is made by a microelectronic fabrication process, i.e. by the deposition of successive layers on a substrate and by the etching of certain of these layers, for example, by photolithography.

Here, the electronic chips concerned comprise thermal transducers capable of converting the temperature variation into a difference in potentials.

For example, electronic chips of this kind are used to make fingerprint detectors.

The present filing party knows of methods for calibrating these chips in which a normal transducer of the chip to be calibrated is placed in contact with a first element having a first thermal characteristic and a corresponding temperature variation $\Delta T_1$ is measured with the normal transducer.

The term "thermal characteristics" of an object or an element designates a characteristic that is a function of the thermal capacity and/or the thermal conductivity of this object or element.

These prior art elements also comprise the placing of the same normal transducer of the chip to be calibrated in contact with a second element having a second thermal characteristic and the measurement of a corresponding temperature variation $\Delta T_2$ with the same normal transducer and the read circuit of the chip to be calibrated.

For example, in the case of a fingerprint detector, the temperature variations $\Delta T_1$ and $\Delta T_2$ preferably correspond to the extreme variations that may be encountered in the normal use of the electronic chip. Thus, the variations $\Delta T_1$ and $\Delta T_2$ correspond respectively to the case in which the normal transducer is in contact with air and to the case in which it is directly in contact with water. Water is an element which best simulates the thermal conductivity that may be possessed by the epidermis of a finger. Indeed, the very great majority of the cells of the epidermis are constituted by water.

Besides, the values measured for the variations $\Delta T_1$ and $\Delta T_2$ vary from one chip to another, even if these electronic chips are identical. Here, the term "identical chips" designates chips that have been obtained by the same fabrication method. It is therefore necessary to renew the measurements of the variations $\Delta T_1$ and $\Delta T_2$ on each chip. This is a lengthy and painstaking task.

In addition, the values of the variations $\Delta T_1$ and $\Delta T_2$ are specific to each chip, and these values are recorded in the chip itself. This necessitates the use of a non-volatile memory in the chip making this chip more complex and costly to obtain.

SUMMARY

The invention is aimed at overcoming at least one of these drawbacks. An object of the invention therefore is a method of calibration comprising:
  the placing of a calibration transducer of the chip to be calibrated in contact with the first element and the measurement of a corresponding temperature variation $\Delta T_c$ with this calibration transducer, the calibration thermal transducer having thermal characteristics different from those of the normal transducer so as to measure a temperature variation $\Delta T_c$ that is different from the variation $\Delta T_1$, and
  the calibration of the chip to be calibrated on the basis of the measured variations $\Delta T_1$ and $\Delta T_c$.

The use of the calibration transducer enables the calibration of the electronic chip without placing it in contact with the second element. Indeed, through the normal transducer and the calibration transducer, there are two different variation values $\Delta T_1$ and $\Delta T_c$ available, as if the chip to be calibrated had been successively put into contact with two elements having different thermal characteristics. However, to obtain these two variations, it is necessary only to place the transducers of the electronic chip in contact with only one of these elements. The calibration method is therefore simplified.

The embodiments of this method may comprise one or more of the following characteristics:
  the calibration comprises:
    the determining of a temperature variation $\Delta T_2$ corresponding to the temperature variation that would be measured by the normal transducer of the chip to be calibrated if this chip were to be put into contact with a second element having a second thermal characteristic on the basis of the measured variations $\Delta T_1$ and $\Delta T_c$ and a predetermined relationship between these variations $\Delta T_1$, $\Delta T_c$ and $\Delta T_2$, and
    the setting of the chip to calibrated on the basis of the determined variation $\Delta T_2$;
  the method comprises:
    the placing of a transducer of time-related temperature variation, called a normal transducer, of the chip to be calibrated in contact (144) with a first element having a first thermal characteristic and the measurement (146) of a corresponding temperature variation $\Delta T_1$ with the normal transistor,
    the placing of a normal transducer and a calibration transducer of a reference chip in contact with the first element and the measuring of the corresponding temperature variations $\Delta T_{1ref}$ and $\Delta T_{cref}$ respectively with this normal transducer and this calibration transducer, the normal transducer and the calibration transducer of the reference chip being identical respectively to the normal transducer and to the calibration transducer of the chip to be calibrated, Method for calibrating an electronic chip to detect a heat pattern, the method comprising:
characterized in that the method comprises at least:
  the placing of a calibration transducer of the chip to be calibrated in contact (144) with the first element and the measurement of a corresponding temperature variation $\Delta T_c$ with this calibration transducer, the calibration thermal transducer having thermal characteristics different from those of the normal transducer so as to measure a temperature variation $\Delta T_c$ that is different from the variation $\Delta T_1$, and 1.—the calibration (154, 156) of the chip to be calibrated on the basis of the measured variations $\Delta T_1$ and $\Delta T_c$.
at least the placing of the normal transducer of the reference chip in contact with the second reference element and the measuring of the corresponding temperature variation $\Delta T_{2ref}$ with this transducer, and
the determining of the relationship between $\Delta T_1$, $\Delta T_c$ and $\Delta T_2$ on the basis of the variations $\Delta T_{1ref}$, $\Delta T_{2ref}$ and $\Delta T_{cref}$ measured by the reference chip;
the calibration is executed each time that the chip to be calibrated is powered on and is followed by the detection of a heat pattern, this calibration comprising the determining of at least one parameter for setting the chip to be calibrated on the basis of the variations $\Delta T_1$ and $\Delta T_c$ and the determining of this determined parameter only in the volatile memory of the chip to be calibrated;
the calibration includes the setting of the sensitivity of the chip to be calibrated as a function of the measured variations $\Delta T_1$ and $\Delta T_c$;
the calibration is executed after the chip to be calibrated is powered on, this calibration comprising the recording of a range of temperature variations to be measured, determined from the variations $\Delta T_1$ and $\Delta T_c$ only in the volatile memory of the chip to be calibrated;
the first element is ambient air and/or the second element is water.

These embodiments of the method also have the following advantages:
the determining of the variation $\Delta T_2$ from the measured variations $\Delta T_1$ and $\Delta T_c$ and of the predetermined relationship makes it possible to determine the variation $\Delta T_2$ without placing the second chip to be calibrated in contact with the second element;
the measuring of the variations $\Delta T_{1ref}$, $\Delta T_{2ref}$ and $\Delta T_{cref}$ makes it possible to determine the predetermined relationship between the variations $\Delta T_1$, $\Delta T_c$ and $\Delta T_2$ for all the chips on the basis of the measurements made on a single chip;
executing the calibration after each time that the chip is powered on and before it is used prevents the use of a non-volatile memory in the chip;
heating the element in contact with the transducer enables the measurement of a temperature variation even when the transducer and the element are initially at the same temperature.

An object of the invention is also an electronic chip for detecting a heat pattern, this chip comprising:
time-related temperature variation transducers including at least one time-related temperature variation transducer called a normal transducer and at least one time-related temperature variation transducer called a calibration transducer, each calibration transducer having thermal characteristics that are different from those of the normal transducer or transducers so as to measure a temperature variation $\Delta T_c$ that is different from a variation $\Delta T_1$ measured by the normal transducer or transducers when these normal and calibration transducers are put into contact with the same element, and
at least one read circuit capable of individually reading the temperature variation measured by these transducers.

The embodiments of this electronic chip may include the following characteristic:
the read circuit is common to all the transducers of the electronic chip, this read circuit being capable of being alternately connected to each transducer.

Finally, an object of the invention is also a heat pattern detector comprising:
the above electronic chip, and
a calibration sub-module capable of calibrating the electronic chip on the basis of the variations $\Delta T_1$ and $\Delta T_c$ measured, respectively with the normal transducer and a calibration transducer when these transducers are put into contact with the same element.

The embodiments of this detector may comprise the following characteristic:
the chip comprises an analog-digital converter of the measurements made by the transducers and a volatile memory connected to this analog-digital converter, this volatile memory being capable of containing the bounds $B_{min}$ and $B_{max}$ defining the extent of the sampling range of the analog-digital converter, and
the calibration sub-module is capable of automatically determining the values of the bounds $B_{min}$ and $B_{max}$ on the basis of the measured variations $\Delta T_1$ and $\Delta t_c$.

BRIEF DESCRIPTION OF THE DRAWINGS

The invention will be understood more clearly from the following description given purely by way of a non-exhaustive example and made with reference to the figures, of which:

FIG. 1 is a schematic illustration of a heat pattern detector,

FIG. 3 is a graph illustrating the temperature variation measured by a transducer of the detector of FIG. 1 in two different situations, FIG. 4 is a schematic illustration in cross-section of the structure of a normal transducer of the detector of FIG. 1, FIG. 7 is a schematic illustration of a read circuit of the transducers of the detector of FIG. 1.

DETAILED DESCRIPTION

Figure 2:
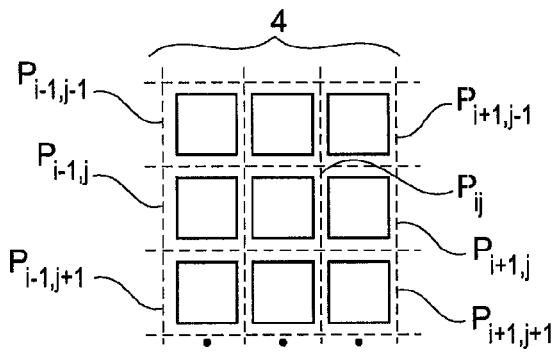
FIG. 2 is a schematic and partial illustration of the distribution of pixels of the detector of FIG. 1 on a sensitive face.

In these figures, the same references are used to designate the same elements.

Here below in this description, the characteristics and functions well known to those skilled in the art are not described in detail.

FIG. 1 shows a heat pattern detector 2.

A heat pattern is a non-homogenous spatial distribution of the thermal characteristics of an object detectable by an electronic chip 3 of the detector 2. A heat pattern of this kind is generally carried by an object. In this embodiment, a fingerprint has a heat pattern detected by means of the detector 2.

The term "thermal characteristic" designates the properties of an object that are functions of its thermal capacity and its thermal conductivity.

Here below in this description, the detector 2 is described in the particular case where it is especially adapted to detecting a fingerprint. In this particular case, the detector 2 is more generally known as a fingerprint detector.

The chip 3 has a sensitive face 4 to which the object incorporating the heat pattern to be read must be applied. Here, this object is a finger 6 whose epidermis is directly resting on the face 4. The fingerprint on the epidermis of the finger 6 takes the form of ridges 8 separated by valleys 10. In FIG. 1, the finger 6 is enlarged several times to make the ridges 8 and the valleys 10 visible.

When the finger 6 lies on the face 4, only the ridges 4 are directly in contact with the face 4. On the contrary, the valleys 10 are isolated from the face 4 by air. Thus, the thermal conductivity between the finger and the face 4 is better at the ridges 8 than it is in the valleys 10. A fingerprint therefore corresponds to a heat pattern that can be read by the chip 3.

To this end, the chip 3 has a multitude of detection pixels $P_{ij}$ placed immediately alongside one another throughout the face 4. A detection pixel $P_{ij}$ is the smallest autonomous surface capable of detecting a temperature variation. The temperature variations detected vary from one pixel to another depending on whether it is in contact with a ridge 8 or facing a valley 10.

These pixels $P_{ij}$ are made on a same substrate 16.

An example of distribution of the pixels $P_{ij}$ alongside one another is shown in FIG. 2. In this example, the pixels $P_{ij}$ are distributed into rows and columns to form a matrix of pixels. For example, the chip 3 has at least two or five rows of at least 100 or 150 pixels each.

Each pixel defines a fraction of the face 4. Here, these fractions of the face 4 are rectangular and demarcated by lines of dashes in FIG. 2. The surface of each fraction is smaller than 1 mm$^2$ and preferably smaller than 0.05 or 0.01 or 0.005 mm$^2$. Here, the fraction of the face 4 defined by each pixel $P_{ij}$ is a square with a 50 µm side. The distance between the geometrical centers of two contiguous pixels is smaller than 1 mm and preferably smaller than 0.5 or 0.1 or 0.01 or 0.001 mm. Here, the distance between the centers of the contiguous pixels $P_{ij}$ is equal to 50 µm.

Each pixel comprises:
  a transducer capable of converting a temperature variation into a difference in potentials, and
  a heating resistor, capable of heating the object in contact with this transducer.

The difference in potentials represents the "measurement" of the temperature variation in the sense that, after calibration, this difference in potentials can be directly converted into a temperature variation.

This heating resistor implements an active detection method such as the one described in the U.S. Pat. No. 6,091, 837. The principle of operation of this active detection method is recalled with reference to FIG. 3. In FIG. 3, the unbroken line represents the progress of the temperature of a transducer in direct contact with a ridge 8 of the finger 6. The curve of dashes for its part represents the progress of the temperature of a transducer facing a valley 10. When the transducer is in direct contact with the ridge 8, the temperature dissipated by the heating resistor of this pixel is expressed by a slower elevation of temperature since a part of this heat is directly transmitted to the finger 6. Conversely, when a transducer is facing a valley 10, the thermal conductivity between this transducer and the finger 6 is lower and the heat produced by the resistance of the pixel leads to a faster rise in the temperature of this pixel. Thus, when the temperature variation between the instants $t_0$ and $t_1$ is read by the transducers, those directly in contact with a ridge 8 read a lower temperature variation $\Delta T_d$ than the variation $\Delta T_1$ read by the pixels facing the valleys 10. This difference in temperature variation enables the detection of the presence of a valley or a ridge at a particular position on the face 4.

The active detection methods have several advantages, including especially the fact that they can work even if the initial temperature of the pixels is close or identical to that of the object carrying the heat pattern. It is also possible to adjust the contrast by controlling the quantity of heat dissipated by the heating resistor of each pixel.

Each pixel $P_{ij}$ is electrically connected to a circuit 14 for reading the measurements of temperature variation performed by each of these pixels. More specifically, the circuit 14 is capable of:
  selecting one or more pixels $P_{ij}$ to be read,
  controlling the heating resistance of the selected pixel or pixels, and
  reading the temperature variation measured by the transducer of the selected pixel or pixels.

Typically, the read circuit is etched and/or deposited in the same rigid substrate 16 as the one on which the pixels $P_{ij}$ are made. For example, the substrate 16 is made of silicon or glass.

The detector 2 also has an electronic computer 20 connected by a wire link 22 to the chip 3. For example, this computer 20 is equipped with a module 24 for driving the chip 3 and a processing module 26.

The module 24 is used to read the heat pattern on the basis of the measurements made by the detection pixels. More specifically, this module is capable of building a map of the ridges and valleys detected by the different pixels as a function of the measurements of the pixels and the known position of these pixels relatively to one another.

This module 24 herein is also equipped with a sub-module 28 for calibrating the chip 3. The working of this sub-module 28 is described with reference to the method described in FIG. 9.

Here, the module 26 is capable of comparing the heat pattern read with a pre-recorded database of heat patterns to identify a particular heat pattern and, in response, to permit or on the contrary prohibit certain actions such as for example, access to a building.

Alternatively, or as a complement, the module 26 is also capable of displaying the heat pattern read on a screen. This makes it possible for example to magnify the heat pattern read.

Typically, the computer 20 is a programmable electronic computer capable of executing instructions pre-recorded on an information recording medium. To this end, the computer 20 is connected to a memory 30 containing instructions, and the data necessary to execute the methods of FIGS. 9 and 11. In particular, the memory 30 contains values $\Delta T_{1ref}$, $\Delta T_{2ref}$ and $\Delta T_{cref}$ necessary for the calibration of the chip 3. These values are described further below with reference to FIG. 9.

The chip 3 has two types of pixels $P_{ij}$: "normal" pixels denoted as $P_{nij}$, and "calibration" pixels denoted as $P_{cij}$. The pixels $P_{nij}$ are qualified as "normal" because they constitute the majority of the pixels (for example more than 90% of the pixels $P_{ij}$) of the chip 3. They are all identical to one another. The term "identical" designates the fact that they have the same heat characteristics and they are all obtained by the same fabrication method. FIG. 4 represents a particular example of an embodiment of a normal pixel $P_{nij}$ of the chip 3.

The pixel $P_{nij}$ has the upper electrode 40 and a lower electrode 42 between which a layer 44 of pyroelectric material is deposited.

Here, the electrode 40 is common to all the pixels of the chip 3. This electrode 40 is connected to ground by means of a ground pin 46. The electrode 40 is the one that is interposed between the finger 6 and the layer 44 when this finger is applied to the face 4. It is therefore made so as to efficiently and swiftly conduct heat towards the layer 44. Here, it is made out of a material that is a good conductor of heat, i.e. having a thermal conductivity above 10 W.m$^{-1}$.K$^{-1}$. It also has a small thickness, i.e. a thickness smaller than 100 μm and preferably smaller than 1 μm. Here, this upper electrode is made out of molybdenum (Mo).

In this embodiment, the layer 44 is made of aluminum nitride. Here, the term "made of" refers to a layer that is made almost exclusively of one and the same material. Thus, aluminum nitride accounts for more than 90% and preferably more than 95% by mass of the layer 44. The layer 44 is also common to all the pixels of the chip 3. The thickness of the layer 44 is greater than 0.5 or 0.6 μm and advantageously greater than 1 μm. Indeed, the greater the thickness of the layer, the greater the amount of charges generated in the material. Here, this thickness is of the order of 2 to 3 μm. This layer converts a temperature variation into a difference in potentials between the electrodes 40 and 42.

The lower electrode 42 is specific to each pixel and electrically insulated from the lower electrodes of the other pixels. It enables a reading of the difference in potentials generated by the layer 44 at the pixel $P_{ij}$. For example, this lower electrode is made out of molybdenum and its thickness is 50 nm.

The pixel $P_{nij}$ also has a heating resistor 46 in the same layer as the one used to form the electrode 42. This heating resistor heats the layer 44 to implement the active detection method.

The electrode 42 and the resistor 46 are connected to the circuit 14 by means of conductive tracks 48 symbolized by a rectangle represented by dashes.

The pixel $P_{nij}$ also has a protective layer 49 deposited on the upper electrode 40 so as to further protect it against abrasion and chemical corrosion as well as against oxidation. This protective layer is made out of material that is a good thermal conductor. It also has a small thickness. For example, the thickness of the layer 49 is strictly smaller than 100 μm and preferably smaller than 10 μm. For example, the protective layer is a layer of aluminum nitride (AlN) with a thickness of some micrometers.

Figure 5:
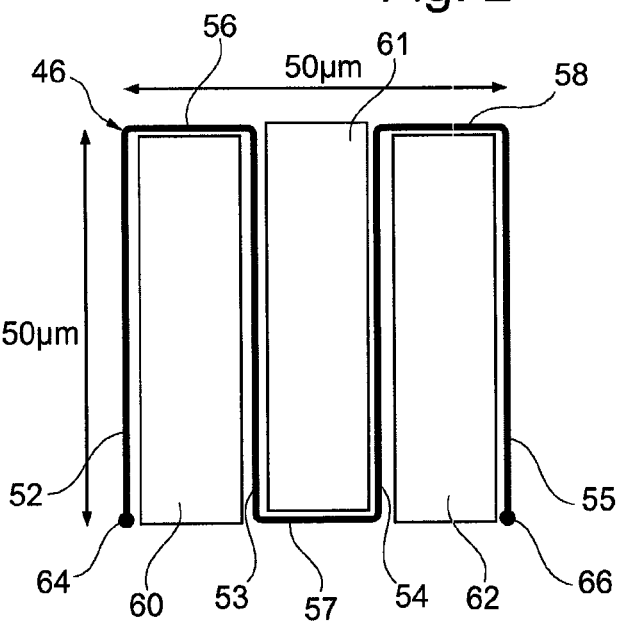
FIG. 5 is a schematic illustration in a top view of the structure of a lower electrode of the transducer of FIG. 4.

FIG. 5 shows a particular layout of the resistor 46 so that it has a resistance higher than 1 KΩ while at the same time occupying less than 15% of the surface area of the pixel $P_{nij}$. Here, the resistor 46 is made out of molybdenum since this metal is obtained by the etching of the same layer as the one used to make the lower electrode 42. The resistor 46 is a resistive tape shaped so as to be meandering. More specifically, the resistive tape is made up of several primary strands 52 to 55 which extend in parallel to each other. These strands are connected in series. For this purpose, the ends of the strands 52 to 55 are connected to one another by secondary strands 56 to 58 which extend perpendicularly to the primary strands. Here, the resistor 46 cuts the lower electrode 42 into three identical rectangular plates 60 to 62. Each plate 60 to 62 is for example 49 μm long and 15 μm wide. The resistive band is spaced out at 0.5 μm from the different plates 60 to 62 so as to be electrically insulated from these plates. The width of the resistive band is 0.5 μm and its total length is 250 μm. Since the thickness of the resistive band is the same as that of the lower electrode, i.e. 50 nm, the resistance of this resistive band between its two ends 64 and 66 is about 1 KΩ when it is made out of molybdenum which has a resistance of 10 μΩ.cm. With such a conformation, the resistor 46 occupies less than 12% of the surface area of the pixel $P_{nij}$.

The plates 60 to 62 are short-circuited between one another by means of vertical pins 70 to 72 (FIG. 4).

The ends 64 and 66 of the resistor 46 are also connected by means of vertical pins to the tracks 48.

In order to facilitate the calibration of the chip 3, the chip also has at least one calibration pixel $P_{cij}$ whose thermal characteristics are different from those of normal pixels $P_{nij}$.

Figure 6:
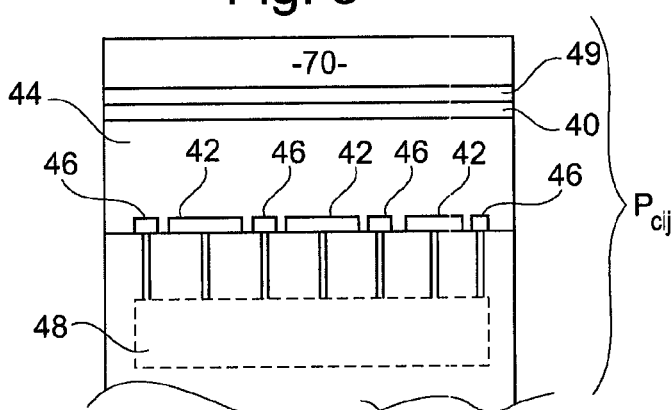
FIG. 6 is a schematic view in vertical section of a calibration transducer of the detector of FIG. 1.

A FIG. 6 shows an example of an embodiment of such a pixel $P_{cij}$. The pixel $P_{cij}$ is identical to the pixel $P_{nij}$ except that, above the protective layer 49, an additional layer 70 has been deposited. Because of this layer 70, the thermal capacity and/or the thermal conductivity of the pixel $P_{cij}$ are different from those of the pixel $P_{nij}$. Thus, under the same conditions, the temperature variation measured at the instant $t_1$ after the heating resistor 46 has been powered is different from that measured by the pixels $P_{ij}$.

FIG. 7 shows an example of an embodiment of the read circuit 14. In this figure, a pixel $P_{ij}$ to be read is symbolically represented in the form of a capacitor with its electrode 40 connected to the ground and its electrode 42 connected to the circuit 14.

The circuit 14 has a set of transistors for resetting the potential of the electrode 42 of any one of the pixels of the chip 3. To simplify FIG. 4, only one transistor 80 of this set is shown. This transistor electrically connects the electrode 42 to an initial potential $V_r$ when it is conducting, and, alternately, allows the potential of the electrode to float when this transistor 80 is non-conducting. When the potential of the electrode 42 is floating, the difference in potentials $\Delta V_p$ between the electrodes 40 and 42 is a function of the temperature variation $\Delta T$. For example, the relation between the difference in potentials $\Delta V_p$ and the temperature variation $\Delta T$ is modeled by the following relationship: $\Delta V_p = \gamma e \Delta T / \epsilon_0 \epsilon_r$, where:

e is the thickness of the layer 44

γ is the pyroelectric coefficient of the material used to make the layer 44, $\epsilon_0$ and $\epsilon_r$ are respectively the absolute permittivity of a vacuum and the relative permittivity of the pyroelectric material.

The circuit 14 also has a set of transistors enabling the selection of any particular one of the pixels $P_{ij}$ of the chip 3 when this pixel is conducting. To simplify FIG. 7, only the transistor 82 of this set has been shown. When the transistor 82 is conducting, it electrically connects the electrode 32 to an amplifier 84 of the potential difference $\Delta V_p$ of the selected pixel.

The circuit 14 also has an analog-digital converter 86 capable of sampling the amplified analog signal output from the amplifier 84 to transmit it to the computer 20. This converter 86 is connected to a volatile memory 88 containing the bounds $B_{min}$ and $B_{max}$ defining the range of voltage to be sampled by the converter 86.

So as to obtain maximum sensitivity, ideally, the bound $B_{min}$ should correspond to the temperature variation $\Delta_d$ obtained when the pixel $P_{nij}$ is directly in contact with the ridge 8 having the best possible thermal conductivity. Similarly, ideally, the bound $B_{max}$ should correspond to the temperature variation $\Delta T_1$ measured by the pixel $P_{nij}$ when it is in contact solely with air.

These bounds $B_{min}$ and $B_{max}$ depend on the thermal characteristics of the pixel $P_{nij}$ but above all on the electrical characteristics of the different electronic components of the circuit 14. Indeed, the characteristic dimensions of the pixel are very appreciably greater than one micrometer and are of the order of ten micrometers. Consequently, any slight imprecision of less than one micrometer when fabricating this transducer has little effect on the thermal characteristics of the pixel. The repeatability and the reproducibility of the thermal characteristics of the pixels is good.

On the contrary, the electronic components of the circuit 14 such as the transistors 80 and 82 have characteristic dimensions very appreciably smaller than one micrometer. Thus, the same imprecision of less than one micrometer during the fabrication of one of the components would lead to a very different mode of operation. Consequently, the repeatability and the reproducibility of the electrical characteristics of the circuit 14 are far worse. Thus, the thermal characteristics of the pixels may be deemed to be substantially constant from one chip to another if the same fabrication method is used. On the contrary, the electrical characteristics have far greater variation from one chip to another even if the same fabrication method is used.

The method of collective fabrication of the chip 3 shall now be described in greater detail with reference to FIG. 8. This method is collective inasmuch as several chips are fabricated simultaneously on the same substrate.

Initially, in a step 100, the circuits 14 and the different tracks 48 of the different chips to be fabricated are etched on the same substrate 16.

Then, a step 102 comprises the making of the vertical pins such as the pins 70 to 72 to connect the lower electrodes and the ends 64 and 66 of the heating resistors to the tracks 48.

Then, in a step 104, a layer of molybdenum is uniformly deposited on the entire substrate to bring it into electrical contact with the different vertical pins made previously.

In a step 106, this molybdenum layer is etched, for example by photolithography, to form the different lower electrodes of each transducer of each chip in one and the same operation and at the same time the resistor 46 of each of the pixels of the different chips.

Then, in a step 108, the layer 44 of aluminum nitride is deposited on the entire substrate so as to form the layer of pyroelectric material of each of the transducers of each of the chips in one and the same operation.

In a step 110, this aluminum nitride layer is etched, for example by photolithography, to form the ground-connection pins 46 for the upper electrode.

In a step 112, a molybdenum layer is deposited on the entire substrate to form the upper electrode common to all the transducers of each chip.

In a step 114, the upper electrode is oxidized to a predetermined depth so as to obtain the desired color. The color obtained depends on the oxidation depth. This oxidation can be done uniformly on the entire upper face of the upper electrode or selectively on only a few parts of this upper face for example so as to draw a logo.

Here, the upper electrode is oxidized on only a fraction of its thickness to preserve the thermal and electrical properties of molybdenum to the maximum.

Then, in a step 116, the protective layer 49 is deposited on the entire substrate.

The additional layer 70 of the pixels $P_{cij}$ is also made during the step 116. For example, an excess thickness of the same material as the one used for the layer 49 is made solely above the pixels $P_{cij}$.

Finally, in a step 118, the substrate is subdivided so as to mechanically separate the different electronic chips made on this substrate from one another.

Once made, the electronic chip is used in a heat pattern detector such as the detector 2. However, before it can be used, in order to maximize its sensitivity, this chip is calibrated.

A method for calibrating these electronic chips shall now be described with reference to the method of FIG. 9.

Figures 8, 9:
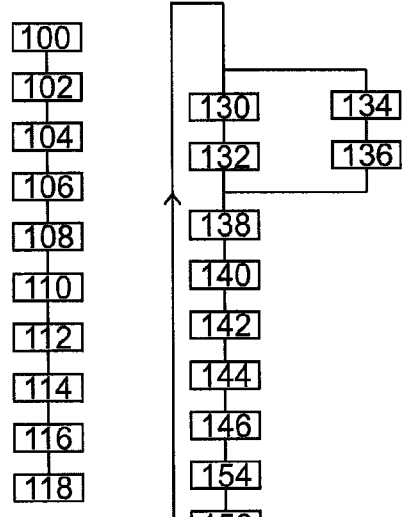
FIG. 8 is a flowchart of a method for fabricating the transducers of the detector of FIG. 1.
FIG. 9 is a flowchart of a method for calibrating the transducers of FIG. 1.

In the method of FIG. 9, measurements are first of all made on a reference electronic chip and then used to calibrate an electronic chip. Here, the reference chip has the same transducers as those of the chip to be calibrated. For example, the reference chip is identical to the chip to be calibrated, i.e. they are obtained by the same fabrication method. Although the same fabrication method has been used, it can happen that the read circuits 14 of these chips do not have the same electrical characteristics because of manufacturing imprecision.

Initially, in a step 130, at least one of the pixels $P_{nij}$ of the reference chip is placed in direct contact with a first element having first thermal characteristics. Here, this first element is chosen to correspond to the element with the poorest thermal conductivity likely to be encountered during the use of the detector 2. For example, in this case, the first element is the ambient air.

Then, in a step 132, the temperature variation $\Delta T_{1ref}$ measured by this pixel $P_{nij}$ is read by the circuit 14 of the reference chip. The method for reading a temperature variation $\Delta T$ by means of a pixel is described in greater detail with reference to FIG. 11.

At the same time, during a step 134, the pixel $P_{cij}$ of the reference chip, is also put into contact with the same first element, i.e. air. During a step 136, the circuit 14 then measures the corresponding temperature variation $\Delta T_{cref}$.

Then, in the steps 132 and 134, the measurements are made with ambient air, and the term used here is "contactless measurement".

Then, at a step 138, at least one of the pixels $P_{nij}$ of the reference chip is put into contact with a second element having thermal characteristics different from those of the first element. Here, the second element is chosen to correspond to the element having the highest thermal conductivity liable to be encountered during a normal use of the detector 2. Since the skin and the epidermis consist essentially of water, the second element here is approximated by water.

At a step 140, the circuit 14 of the reference chip is used to read the temperature variation $\Delta T_{2ref}$ measured by this pixel $P_{cij}$.

At a step 142, the variations $\Delta T_{1ref}$, $\Delta T_{cref}$ and $\Delta T_{2ref}$ are recorded in the memory 30 of any detector using a chip fabricated by the same fabrication method as the one used to fabricate the reference chip. For example, these variations are recorded in the code of the calibration sub-module 28.

Figure 10:
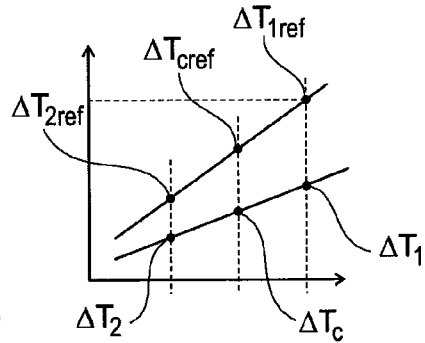
FIG. 10 is a graph illustrating the measurements made during the implementation of the method of FIG. 9.

Generally, the variation $\Delta T_{cref}$ corresponds to the temperature variation that would be measured if the pixel $P_{nij}$ were to be put into contact with an object having thermal characteristics between those of the first and second elements. The variations $\Delta T_{1ref}$, $\Delta T_{cref}$ and $\Delta T_{2ref}$ measured during the steps 130 to 140 with the reference chip can therefore be represented on the same graph (FIG. 10) as a function of the thermal characteristics of the object put into contact with the pixel $P_{nij}$. Here, it is assumed that the measured temperature variations vary linearly as a function of the thermal characteristics of the object.

In a second phase, the chip to be calibrated is calibrated by using the variations $\Delta T_{1ref}$, $\Delta T_{cref}$ and $\Delta T_{2ref}$ recorded in the memory 30 of the detector 2 incorporating this chip.

More specifically, in a step 144, at least one of the pixels $P_{nij}$ and the pixel $P_{cij}$ of the second chip is put into contact with the same first element, i.e. air, as was done during the step 10.

At a step 146, the circuit 14 of the chip to be calibrated reads the temperature variations $\Delta T_1$ and $\Delta T_c$ measured, respectively, by the pixels $P_{nij}$ and $P_{cij}$. A contactless measurement is then made during the step 146.

Then, at a step 154, the temperature variation $\Delta T_2$ that would be measured by the pixel $P_{nij}$ of the chip to be calibrated, if it were put into contact with the second element, i.e. with water, is determined without this pixel being really put into contact with water. More specifically, the variation $\Delta T_2$ is determined on the basis of a predetermined relationship which links it to the measured variations $\Delta T_1$ and $\Delta T_c$. This relationship is determined from the variations $\Delta T_{1ref}$, $\Delta T_{2ref}$ and $\Delta T_{cref}$.

To simplify the explanation, it is assumed here that the variations $\Delta T$ measured vary linearly as a function of the thermal characteristics of the object applied to the face 4. There is therefore a ratio $\alpha$ of proportionality between, for example, the differences $\Delta T_{2\ ref} - \Delta T_{1\ ref}$ and $\Delta T_{1ref} - \Delta T_{cref}$. It is assumed that this ratio $\alpha$ is maintained from one chip to another. This assumption is reasonable since the thermal characteristics of the pixels are more stable from one chip to another than are the electrical characteristics of the circuits 14. In these conditions, the predetermined relationship linking the variation $\Delta T_2$ with the measured variations $\Delta T_1$ and $\Delta T_c$ is for example the following:

$$\Delta T_2 = \Delta T_1 - (\Delta T_{2\ ref} - \Delta T_{1\ ref})(\Delta T_1 - \Delta T_c)/(\Delta T_{1ref} - \Delta T_{cref})$$

At a step 156, the sub-module 28 uses the variations $\Delta T_1$ and $\Delta T_2$ to set the chip, i.e. to determine at least one parameter for setting the chip. Each parameter for setting the chip modifies the working or performance of the chip when it is modified. Here, the setting consists in adjusting the sensitivity of the circuit 14. More specifically, the setting parameters are two bounds $B_{min}$ and $B_{max}$ of the converter 86. These bounds are computed on the basis of the variations $\Delta T_1$ and $\Delta T_2$ to maximize the sensitivity of the circuit 14. For example, the bound $B_{min}$ corresponds to the variation $\Delta T_2$ and the bound $B_{max}$ corresponds to the variation $\Delta T_1$. This computation is for example performed by the sub-module 28. Then the values of the bounds $B_{min}$ and $B_{max}$ are recorded in the memory 88.

The steps 154 and 156 form a phase of calibration of the electronic chip. This calibration phase is routinely activated after each time that the chip is powered on followed by a use of the chip to read a heat pattern.

Preferably, the calibration method is executed by the sub-module 28 at each time that the electronic chip is powered on. Thus, it is not necessary to store the variations $\Delta T_{1ref}$, $\Delta T_{2ref}$ and $\Delta T_{cref}$ or the ratio $\alpha$ on the electronic chip 3 itself.

Figure 11:
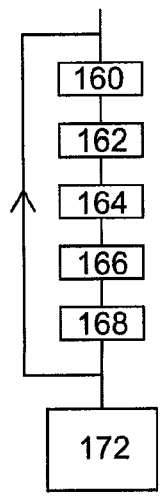
FIG. 11 is a flowchart of the method of operation of the detector of FIG. 1.

The working of the detector 2 and more specifically of the circuit 4 shall now be described with reference to the method of FIG. 11.

To read a heat pattern, the measurements of each pixel $P_{nij}$ of the chip 3 are acquired. To this end, initially in a step 160, the transistor 80 is activated to connect the electrode 42 to the resetting potential $V_r$. Typically, the resetting potential is low if the temperature variation leads to increasing the voltage and, on the contrary it is high if the temperature variation measured leads to reducing this voltage.

Then, at a step 162, the circuit 14 makes the current flow in the heating resistor 46 to heat the pixel $Pn_{ij}$. If necessary, at a step 162, the circuit 14 also activates the passage of a current between the terminals of the heating resistors of all the pixels immediately adjacent to the pixels used to make this measurement. This increases the calorific power delivered.

Then, at a step 164, the transistor 80 is activated so that it becomes non-conducting. The voltage at the electrode 42 is therefore floating and, from this instant onwards, it follows the temperature variation. The opening of the transistor 80 is applied solely after the heating resistor 46 has been powered on so that the disturbances related to the activation of the heating resistor have no effect on the subsequent operation of the pixel $P_{nij}$.

At a step 166, the transistor 82 is activated to select the pixel $P_{nij}$. Starting from this moment, the electrode 42 is electrically connected to the amplifier 84 and then to the analog-digital converter 86. The difference in potentials between the electrodes 40 and 42 is then sampled and then transmitted to the computer 20.

Then, at a step 168, after the reading of the difference in potentials between the electrodes 40 and 42, the heating resistor 46 is stopped.

The steps 160 to 168 are repeated for all the pixels $P_{nij}$ of the chip 3. This iteration for all the pixels of the chip enables the preparation of a map of the heat pattern. Typically, more than 100 or 1000 maps are prepared per second.

At a step 172, the different maps prepared are processed by a unit 26 so as to reveal the heat pattern and, in response, to trigger certain actions.

Many other embodiments are possible. For example, the upper or lower electrodes may be made of other materials such as tungsten or titanium.

The upper electrode is not necessarily common to all the pixels.

The protective layer may be omitted or made out of materials other than aluminum nitride. When the protective layer is omitted, the object carrying the heat pattern to be detected comes directly to rest on the upper electrode. When the protective layer is made of another material, it can be made out of silicon nitride.

The layer of pyroelectric material is not necessarily made only out of aluminum nitride. Indeed, the layer of pyroelectric material can be a mixture of aluminum nitride and one or more other materials that do not hamper the circulation of the charges between the electrodes. The proportion of aluminum nitride in this mixture is then at least 10, 25, 50 or 75% by mass. The other materials themselves may or may not be pyroelectric materials.

In all the embodiments described here, aluminum nitride may be replaced by a nitride or a mixture of nitrides chosen from the group formed by the III-V nitrides. In particular, the layer of pyroelectric material may be based on a nitride or a mixture of nitrides chosen from the group formed by aluminum nitride, gallium nitride and indium nitride.

Other layers may be introduced in addition to the pyroelectric layer based on III-V nitride between the lower and upper electrodes. In order that the transducer may work, this additional layer or each of these additional layers is made out of a material that does not hamper the flow of charges between these electrodes. This additional layer or these additional layers may be made of other pyroelectric materials. For example, between the electrodes, at least one layer of aluminum nitride is stacked on or beneath another layer of LZT (Lead zirconate titanate) or carbon.

The heating resistor may be formed out of the same layer of material as the one etched to form the upper electrode.

The resistivity of the resistor 46 may be increased by thinning the resistive band.

In other embodiments the heating resistor may be common to several pixels. In this case, for example, the resistive band crosses several pixels before meeting its ends 64 and 66.

In another embodiment, the heating resistor does not separate the electrode into several plates. For example, the heating resistor may be shaped so as to extend along the external periphery of the electrode. For example, the heating resistor extends along more than 80% of the periphery of this electrode.

The heating resistor can also be buried beneath the lower electrode and not necessarily made at the same level as this electrode.

The calibration sub-module 28 can also be implanted in the electronic chip. Preferably, it is then implemented in hardware form in the substrate 16.

The values of the variations $\Delta T_1$ and $\Delta T_2$ can also be used for applications other than the setting of the sensitivity of the analog-digital converter. Any step for using the determined variation $\Delta T_2$ without placing it in contact with the second element is herein considered to be a calibration step. For example, these variations $\Delta T_1$ and $\Delta T_2$ are used to set an analog amplifier which amplifies the signal measured only if it is contained between bounds $B_{minA}$ and $B_{maxA}$. For example, the bound $B_{minA}$ is adjusted as a function of the variation $\Delta T_1$ and the gain of the amplifier is set as a function of the variations $\Delta T_1$ and $\Delta T_2$.

Several calibration pixels $P_{cij}$ can be used. These calibration pixels do not all necessarily have the same thermal characteristics. In particular, if the relationship between $\Delta T_c$, $\Delta T_1$ and $\Delta T_2$ is not linear, then several calibration pixels having different thermal characteristics are used to determine $\Delta T_2$ without any need to apply the second element to the chip.

If several calibration pixels having different thermal characteristics are used, it is also not necessary to measure the difference in potentials without contact of a normal pixel $P_{nij}$ to determine $\Delta T_1$. For example, if the relationship between the temperature variations and the variations of the thermal characteristic of the object is linear, then two calibration pixels having different thermal characteristics are sufficient to determine $\Delta T_2$ without any measurement being made with a normal pixel $P_{nij}$.

The roles of the normal pixels $P_{nij}$ and calibration pixels $P_{cij}$ can be inverted in the calibration method described here above.

It is also possible to provide for a calibration pixel for which the thermal characteristic is modified so as to measure a temperature variation corresponding to the contact with the second element when it is in contact with the first element. For example, the additional layer 70 is replaced by a capsule containing water.

Other embodiments of the calibration pixel $P_{cij}$ are possible. For example, a substantial metal mass is placed in the vicinity of the heating resistor to act as a heat sink and prevent this pixel from heating too rapidly.

In another embodiment, the heating resistance of the pixel $P_{cij}$ is reduced as compared with that of a normal pixel.

The read circuit of the transducers is not necessarily common to all the pixels of the heat pattern detector. For example, as a variant, a first read circuit is planned for the reading of the normal pixels and a second independent read circuit is planned for the reading of the calibration pixels.

The use of a layer based on III-V nitride and especially based on aluminum nitride as a pyroelectric material can be applied both to passive detection pixels and to active detection pixels. Passive detection pixels are pixels devoid of heating resistance. Thus, the pixel does not heat the object to reveal the heat pattern but uses only the temperature of the object.

The object in contact with the sensitive face can be immobilized or forced to shift along this sensitive face. For example, the finger can scan the sensitive face. A scan of this kind makes it possible to read a heat pattern which extends on a surface area strictly greater than the surface area of the sensitive face. Such a method is described in the U.S. Pat. No. 6,289,114.

One and the same electronic chip may comprise one or more matrices of pixels and one or more read circuits etched or deposited on the substrate of this chip.

Numerous other applications of the detector 2 are possible. In particular, the detector 2 enables the detection of the heat pattern not only for a fingerprint but also for any object having a heat pattern such as a bank note or a fabric.

For example, it is not necessary in every application that there should be direct contact between the sensitive face and the object. Thus, the electronic chip described here can also be used as a thermal camera.

Nor is it necessary for the object to have ridges and valleys in order to show a heat pattern. In fact, the surface area of the object may be uniformly flat. In this case, the surface area corresponds to local differences in thermal characteristics detectable by the pixels of the chip. For example, the object may be a finger in which the fingerprint is entirely worn out. Indeed, even when the epidermis no longer has any valleys and ridges, it still has differences in local characteristics that can be detectable on the electronic chip as explained in the patent application EP 0 825 831.

The oxidation of the upper face of the upper electrode can be implemented independently of the other characteristics of the detection pixel described here above. For example, the oxidized upper electrode can be implemented with other layers of pyroelectric material than those based on aluminum nitride or III-V nitride.

Similarly, the different embodiments of the heating resistor described here can be implemented independently of the other characteristics of the transducer. For example, the making of the heating resistor by a resistive band which divides the electrode into several plates can be implemented independently of the other characteristics of the detection pixel described here above. In particular, this conformation of the electrode can be applied whatever the pyroelectric material used.

Finally, the different characteristics of the detector needed to implement the calibration method described here can be implemented independently of the characteristics of this detector and in particular independently of the pyroelectric material used.

The invention claimed is:

1. A method comprising calibrating an electronic chip to detect a heat pattern, wherein calibrating said electronic chip comprises placing a normal transducer of the chip to be calibrated in contact with a first element having a first thermal characteristic, the normal transducer being a transducer of time-related temperature variation, measuring a corresponding time-related temperature variation $\Delta T_1$ with the normal transducer, placing a calibration transducer of the chip to be calibrated in contact with the first element, measuring a corresponding time-related temperature variation $\Delta T_c$ with the calibration transducer, the calibration transducer having thermal characteristics different from those of the normal transducer so as to measure a temperature variation $\Delta T_c$ that differs from the variation $\Delta T_1$, and calibrating the chip to be calibrated on the basis of the measured variations $\Delta T_1$ and $\Delta T_c$, wherein calibrating the chip comprises: determining a temperature variation $\Delta T_2$ corresponding to a temperature variation that would be measured by the normal transducer of the chip to be calibrated if the chip to be calibrated were to be put into contact with a second element having a second thermal characteristic, wherein determining the temperature variation is carried out on the basis of the measured variations $\Delta T_1$ and $\Delta T_c$ and a predetermined relationship between the variations $\Delta T_1$, $\Delta T_c$ and $\Delta T_2$, and setting the chip to be calibrated on the basis of the determined variation $\Delta T_2$.

2. The method of claim 1, further comprising: placing a normal transducer and a calibration transducer of a reference chip in contact with the first element, measuring corresponding temperature variations $\Delta T_{1ref}$ and $\Delta T_{cref}$ respectively with the normal transducer and the calibration transducer, the normal transducer and the calibration transducer of the reference chip being identical respectively to the normal transducer and to the calibration transducer of the chip to be calibrated, at least placing the normal transducer of the reference chip in contact with the second element, measuring a corresponding temperature variation $\Delta T_{2ref}$ with the normal transducer, and determining the relationship between $\Delta T_1$, $\Delta T_c$ and $\Delta T_2$ at least in part on the basis of the variations $\Delta T_{1ref}$, $\Delta T_{2ref}$, and $\Delta T_{cref}$ measured by the reference chip.

3. The method of claim 1, wherein calibrating the chip comprises calibrating when the chip to be calibrated is powered on and subsequently used for detecting a heat pattern, wherein calibrating the chip further comprises determining at least one parameter for setting the chip to be calibrated on the basis of the variations $\Delta T_1$ and $\Delta T_c$, and recording the determined parameter only in a volatile memory of the chip to be calibrated.

4. The method of claim 1, wherein calibrating the chip comprises: setting a sensitivity of the chip to be calibrated as a function of the measured variations $\Delta T_1$ and $\Delta T_c$.

5. The method of claim 1, further comprising, in response to a transducer being put in contact with one of the elements, heating the element in contact with the transducer, and measuring a rise in temperature of the heated reference element using the transducer.

6. The method of claim 1, wherein the first element comprises ambient air.

7. The method of claim 1, wherein the second element comprises water.

8. The method of claim 1, wherein the normal transducer and the calibration transducer are pyroelectric transducers, each having at least one layer of identical pyroelectric material.

9. An apparatus for detecting a heat pattern, the apparatus comprising a calibration sub-module and an electronic chip for detecting the heat pattern, the electronic chip comprising: normal transducers of time-related temperature variations, at least one calibration transducer for transducing time-related temperature variations, each calibration transducer having thermal characteristics that differ from those of the normal transducers so as to measure a temperature variation $\Delta T_c$ that differs from a variation $\Delta T_1$ measured by a normal transducer when the normal and calibration transducers contact the same element, and at least one read circuit capable of individually reading the temperature variation $\Delta T_1$ measured by the normal transducers when the normal transducer of the chip is placed in contact with a first element having a first thermal characteristic, and the temperature variation $\Delta T_c$ measured by the calibration transducer when the calibration transducer of the chip is placed in contact with the first element having a first thermal characteristic, wherein the calibration sub-module is configured to be capable of calibrating the electronic chip at least in part on the basis of the variations $\Delta T_1$ and $\Delta T_c$ measured, respectively with the normal transducer and a calibration transducer when these transducers contact the same element, wherein the calibration sub-module is further configured to determine a temperature variation $\Delta T_2$ corresponding to a temperature variation that would be measured by the normal transducer of the chip to be calibrated if the chip to be calibrated were to be put into contact with a second element having a second thermal characteristic at least in part on the basis of the measured variations $\Delta T_1$ and $\Delta T_c$ and a predetermined relationship between the variations $\Delta T_1$, and $\Delta T_c$ and $\Delta T_2$, and to set the chip to be calibrated on the basis of the determined variation $\Delta T_2$.

10. The apparatus of claim 9, wherein the read circuit is common to the normal transducers and the calibration transducer, the read circuit being configured to be connected alternately to each transducer.

11. The apparatus of claim 9, wherein the normal transducer and the calibration transducer are pyroelectric transducers, each having at least one layer of identical pyroelectric material.

12. The apparatus of claim 9, wherein: the electronic chip further comprises an analog-digital converter for converting measurements made by the transducers, and a volatile memory connected to this analog-digital converter, the volatile memory being capable of containing bounds $B_{min}$ and $B_{max}$ defining an extent of the sampling range of the analog-digital converter, and wherein the calibration sub-module is capable of automatically determining the values of the bounds $B_{min}$ and $B_{max}$ at least in part on the basis of the measured variations $\Delta T_1$ and $\Delta T_c$.

* * * * *